J. A. GERRY.
MACHINE FOR CUTTING GREEN CORN.
APPLICATION FILED JAN. 16, 1908.
954,085.
Patented Apr. 5, 1910.
2 SHEETS—SHEET 2.
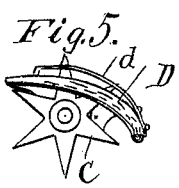
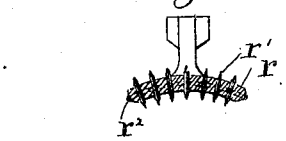
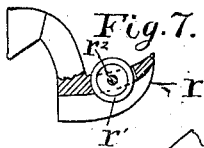
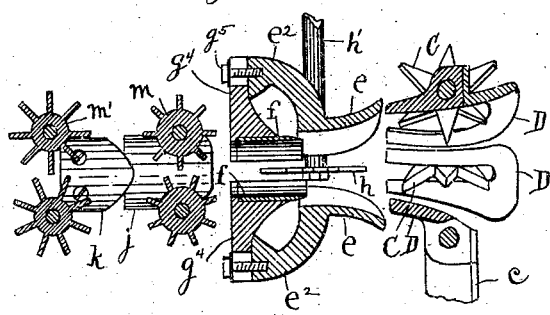
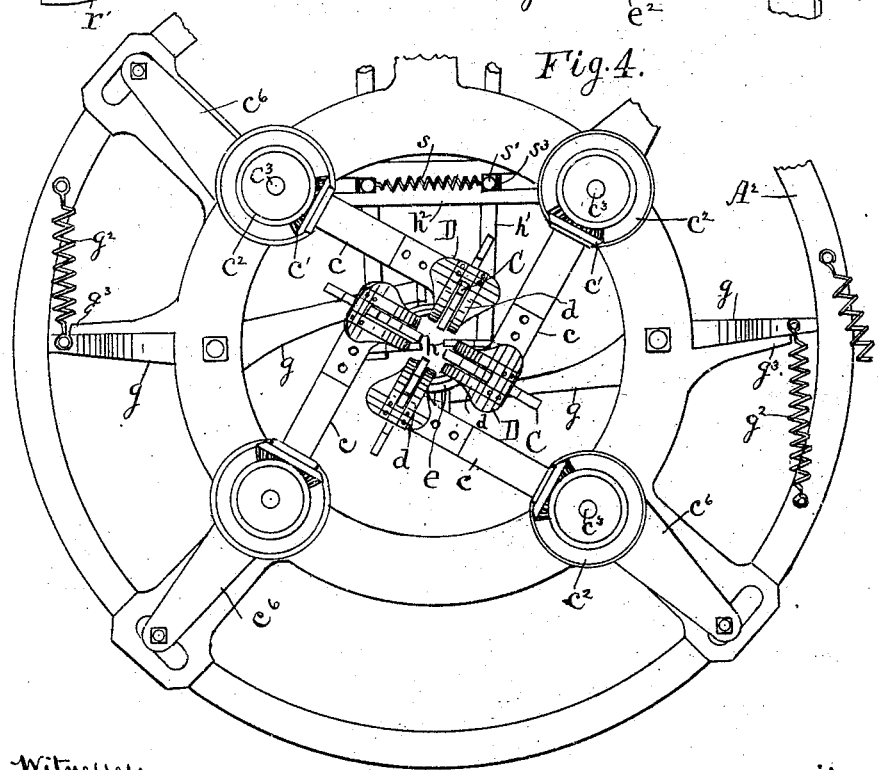

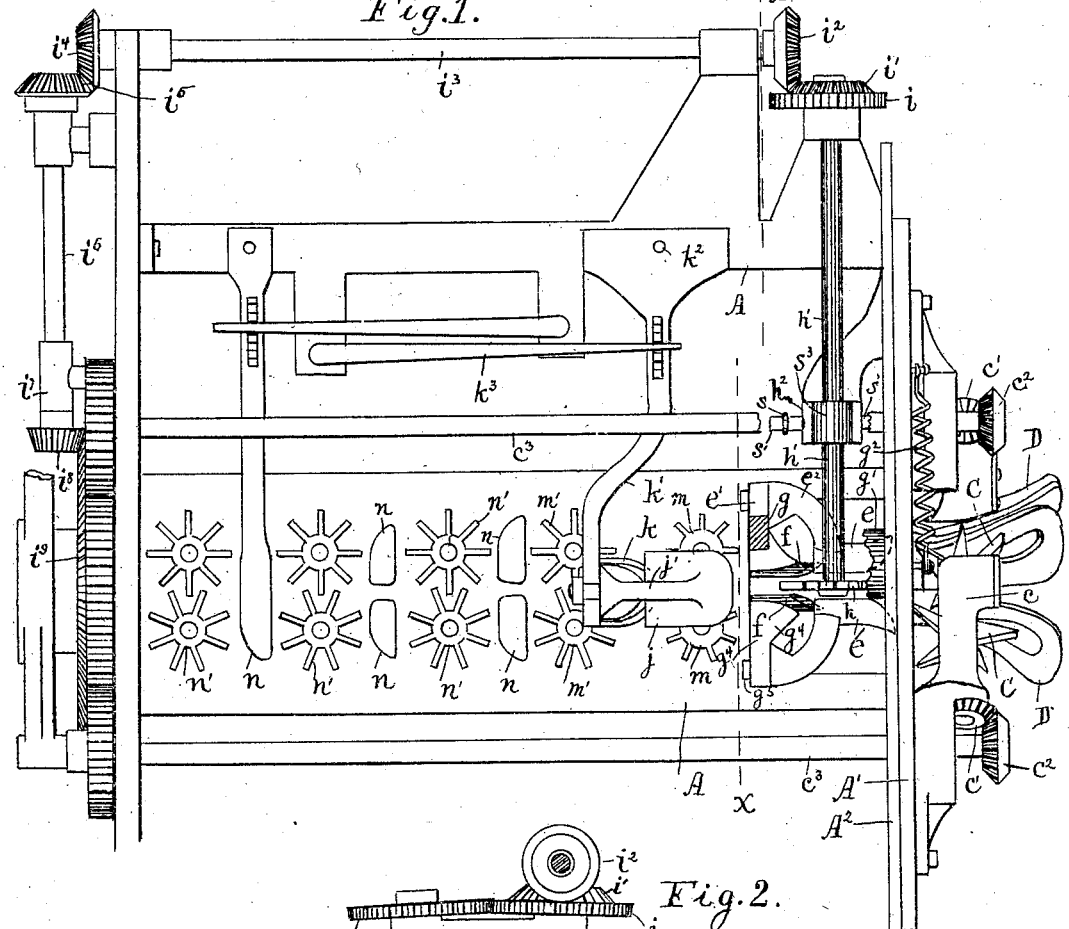

UNITED STATES PATENT OFFICE.

JAMES A. GERRY, OF MECHANIC FALLS, MAINE.

MACHINE FOR CUTTING GREEN CORN.

954,085.   Specification of Letters Patent.   Patented Apr. 5, 1910.

Application filed January 16, 1908. Serial No. 411,057.

*To all whom it may concern:*

Be it known that I, JAMES A. GERRY, a citizen of the United States of America, and resident of Mechanic Falls, Androscoggin county, State of Maine, have invented certain new and useful Improvements in Machines for Cutting Green Corn, of which the following is a specification.

My invention relates to a machine for cutting green corn from the ear used in the corn canning industry and known as the "Sprague cutter," the same being shown and described in several United States Letters Patent, among them being No. 256,926, dated April 25, 1882, and issued to W. Sprague.

In these machines as they have hitherto been constructed there was no effective gage for guiding the ear of corn as it passed to and through the first set of cutters so that the corn was liable to be unevenly cut. Again, there were no feed wheels adapted to act on the ear of corn from a point in front of the first cutting knives to a point in the rear of said knives and consequently short ears were liable to stick in the cutting knives and clog the machine.

Another improvement which I have made in the machine is to provide a set of slitting disks whereby the kernels are slit in a direction parallel with the axis of the ear, thus cutting the hull up into small pieces and improving the character of the resulting product.

I illustrate my invention in the accompanying drawing in which—

Figure 1 represents a front elevation of the working part of a "Sprague" cutter with my improvement attached, Fig. 2 is a section on the line $x\ x$ of Fig. 1 looking toward the right or front end of the machine, Fig. 3 is a central vertical and longitudinal section showing the parts to which my improvement relates, Fig. 4 is an end elevation looking at the front end of the machine, Fig. 5 is an end view of one of the spur feeding wheels with the guides provided with a bearing spring. Fig. 6 is a transverse section through a modified form of the gage and Fig. 7 is a longitudinal section through the same.

In the drawing, A represents the frame work of the machine, A' the front ring to which the initial feeding mechanism is attached, $A^2$ is the movable ring supported by the arms $a$ of the ring A' for effecting the adjustments of the spur wheels.

C C are the spur wheels, D their slotted guides, $c$ the arms in which the spur wheels are journaled, $c'\ c'$ the bevel gears on the spur wheel shafts, $c^2$ the bevel gears on the driving shaft $c^3$, $c^6$ are the rear extensions of the arms $c$ and $m'\ n'$ and $n$ are the feed wheels and scrapers not involved in my invention.

The parts above enumerated are those which are common to machines of this class as shown in the above mentioned Letters Patent and need no further description.

In carrying out my improvements I provide a pair of feed wheels $h$ immediately in rear of the spur wheels C for seizing the ear as soon as it passes through the spur wheels. These wheels $h$ are preferably horizontally disposed and secured on the lower ends of a pair of vertical shafts $h'$, the upper ends of the shafts being loosely journaled in the top of the machine so that the lower ends may have a limited motion from and toward each other. The shafts $h'$ have on their upper ends engaging gears $i$ and $i^{10}$, the gear $i$ having a bevel gear $i'$ formed on it which engages a bevel gear $i^2$ on a shaft $i^3$. (Fig. 1.) Power is applied to this shaft through a bevel gear $i^5$ on a vertical shaft $i^6$ which engages a bevel gear $i^4$ on the shaft $i^3$. On the lower end of the shaft $i^6$ is a bevel gear $i^8$ engaging a gear $i^9$ which is one of the features of the old machine.

Means are provided for forcing the wheels $h$ toward each other so that they will automatically seize the ear on each side and feed it longitudinally. For this purpose I journal each shaft at a point somewhat above its lower end in a sliding bearing, connecting those bearings by springs which tend to pull them together. As here shown, each shaft passes through a bearing $s^3$ which is held in a horizontal slot formed in one end of a fixed block $h^2$ in such a way that it may be moved horizontally in and out. A pin $s'$ extends out at each side of the bearing and plays in a slot in the block, the corresponding pins in the two bearings being connected by springs $s$. Thus, the feed wheels $h$ are yieldingly supported so that when the ear strikes them it is seized and fed along.

The first pair of cutting knives with suitable gages are located at the same point as the wheels $h$ but above and below the same so that they do not interfere with the operation of the wheels which come between the sides of the gages and knives. The gages $e$ are made concave to conform more or less to the contour of the ear and each as shown, has at its rear end an elbow by which it is adjustably secured to the end of a pivoted arm $g$ by a nut and bolt $g^5$. A vertical slot in the end of the arm permits a vertical adjustment. The knife $f$ is secured by means of screws to a foot piece $g^4$ on the end of the arms $g$ and the knife is concave in cross section to conform to the curvature of the largest ear, pointed at its forward end and of considerable length so as to give a good bearing on the ear and prevent sudden variations of cut. The cutting edges are thus made to act with a shearing cut which is the most effective. As here shown, the forward point of the knife is just forward of the rear end of the gage (Fig. 3) and as much spaced from it as is desired for the thickness of the cut. The gage being of considerable length, gives with the knife itself a long bearing and makes the cut uniform in its action. The arms $g$ to the inner ends of which the gages and knives are secured, are pivoted to the studs $g'$ on the ring $A'$, one above and one below the center of the ring and an outer extension of each of the arms $g$ is connected by a spring $g^2$ with the ring $A^2$, these springs tending to force the gages and knives toward the center. Stops $g^3$ are provided on the ring $A'$ to limit the throw of the arms $g$ so that the knives and gages will not come together.

Immediately in rear of the knives $f$, gages $e$ and wheels $h$ which constitute a set of cutting and feeding devices, I locate a second set for cutting that portion of the ear which was not cut by the knives $f$, in this case the side portions. In the second set the feed wheels $m$ are the ordinary feed wheels with horizontal axes common in the old machine and they are shown here as working between a set of gages $j$ such as have already been described, having elbows $j'$ by which they are secured to the lower ends of vertical arms $k'$ pivoted loosely on a pin $k^2$ at the upper portion of the machine, the pair of arms being pressed together by a spring $k^3$ in the old way. The knives K are similar to the knives $f$ and have the same relation to the gages. Beyond the second set of cutters are the usual feed wheels and scrapers common to the old machine and already pointed out.

It will be seen from what has been said that the ear as soon as it passes through the spur wheels C is immediately seized by the wheels $h$ and confined between the gages $e$ by which it is guided to the knives $f$ where the corn is cut evenly and to any desired depth according as the gages are set, the long bearing of the knives and gages insuring a uniform cut. As soon as the ear gets beyond the knives $f$ it is seized by the wheels $m$ and passed through the second set of cutters and so on through the machine.

As a result of the changes specified I find from experience that my machine will do twice as much work in a given time as the old machine now on the market on account of not being obliged to make stops to clear out obstructing ears, my machine passing through ears of any length, the short equally well with the long ears and cutting all the kernels at just the depth desired to produce the best results. The capacity of the machine is thus increased and the character of the goods packed is greatly improved and considerable waste is saved by reason of the fact that I can work the small ears.

In Figs. 4 and 5 I show the guides D provided with convex bearing springs $d$ arranged at each side of the spur wheels. The springs are secured at the rear ends of the guides and are rounded up nearly to the outer points of the spur wheel, the front ends of the springs being free. As a result, the wearing of the ear will come to a great extent on the springs rather than on the points of the spur wheel and the ear will be fed more evenly.

In Figs. 6 and 7, I show a modified form of gage in which slitting knives are provided for slitting the kernels of corn in the direction of the length of the ear so that the product will come out in relatively small pieces and the presence of whole kernels will be prevented. This quality of product is preferred by some classes of trade and when it is desired I make use of the slitting devices shown.

In Figs. 6 and 7 $r$ represents one of the gages having a series of small thin slitting wheels or disks $r'$ journaled in suitable slots in the gage by means of a pivoting pin $r^2$. These rotating cutters are spaced apart less than the ordinary width of a kernel and they act to slit the corn lengthwise on the cob and cut it into small pieces. The knives will not clog because they continually tend to revolve and thus to clear themselves.

I claim:—

1. In a machine of the class described for cutting green corn from the ear, the combination of a set of spur wheels for feeding the ear of corn into the machine, a pair of concave yieldingly supported gage plates, one on each side of the ear adjacent to said spur wheels, a pair of cutting knives secured to and coöperating with said gage plates, a pair of yieldingly supported feed wheels for acting on the ear between the said gage plates, a second pair of yieldingly supported gage plates beyond the first pair and located at right angles thereto, cutting knives for the same, a pair of feed rolls acting between said last named gage plates and feed wheels and scrapers beyond said gage plates and knives.

2. In a machine of the class described for cutting green corn from the ear, the combination of a set of spur wheels for feeding the ear of corn into the machine, a pair of yieldingly supported feed wheels for acting on the sides of the ear immediately in rear of said spur wheels and rotating on vertical axes, a pair of yieldingly supported concave gage plates for guiding the top and bottom of the ear and located above and below said feed wheels, cutting knives coöperating with said gage plates, a set of feed wheels, gage plates and feed knives located at right angles to those above described and in rear of the same and feed rolls and scrapers in rear of said cutting knives.

3. In a machine of the class described for cutting green corn from the ear, the combination of a set of spur wheels for feeding the ear into the machine, a pair of feed wheels immediately in rear of said spur wheels, a set of gages and knives for cutting the corn from the portion of the ear at right angles to said feed wheels located at substantially the same point as said feed wheels, and means for cutting the balance of the ear and feeding and scraping the same.

4. In a machine of the class described for cutting green corn from the ear, the combination of a set of spur wheels for feeding the ear of corn to the machine, a pair of feed wheels immediately in rear of the spur wheels, a set of gages and knives for cutting the corn from the portion of the ear at right angles to said feed wheels located at substantially the same point as said feed wheels, a second pair of feed wheels and a coöperating set of gages and knives acting at right angles to the first named set, and means for completing the scraping of the ear.

5. In a machine of the class described for cutting green corn from the ear, the combination of a set of spur wheels for feeding the ear of corn into the machine, a pair of feed wheels secured to the lower ends of vertical shafts immediately in rear of said spur wheels, a spring for drawing said shafts toward each other, means for rotating said shafts, a pair of horizontal arms, a gage and knife secured to the end of each of said arms, one set above and one below the said feed wheels, a pair of feed wheels in rear of said gages and knives on the ends of horizontal shafts, a pair of vertical arms, a gage and knife secured to the lower end of each vertical arm, one set at each side of the last mentioned feed wheel and a spring for pressing said vertical arms toward each other.

6. In a machine for cutting green corn from the cob, the combination of a cutting knife, a gage therefor placed in advance of the cutting knife and a series of disk cutters journaled in said gage each cutter with a transverse axis for slitting the corn lengthwise of the ear.

7. In a machine for cutting green corn from the ear, the combination of a set of spur wheels for feeding the ears of corn to the cutters, guide plates provided with longitudinal slots through which the wheels project and springs secured to said guide plates at each side of said wheels adapted to bear on the surface of the ear to relieve the pressure on the points of the spur wheels.

Signed by me this 27 day of December, 1907.

JAMES A. GERRY.

Witnesses:
S. W. BATES,
ELEANOR W. DENNIS.